(12) United States Patent
Ito (10) Patent No.: US 8,542,384 B2
(45) Date of Patent: Sep. 24, 2013

(54) IMAGE PROCESSING APPARATUS, IMAGE FORMING APPARATUS, AND COMPUTER READABLE MEDIUM STORING PROGRAM FOR SHARED IMAGE PROCESSING

(75) Inventor: Keiichi Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 365 days.

(21) Appl. No.: 12/879,499

(22) Filed: Sep. 10, 2010

(65) Prior Publication Data

US 2011/0235099 A1 Sep. 29, 2011

(30) Foreign Application Priority Data

Mar. 23, 2010 (JP) ................................ 2010-066221

(51) Int. Cl.
*G06F 3/12* (2006.01)
(52) U.S. Cl.
USPC ........................................ 358/1.15; 358/1.13
(58) Field of Classification Search
USPC ............................................... 358/1.13, 1.15
See application file for complete search history.

(56) References Cited

U.S. PATENT DOCUMENTS

2005/0275884 A1* 12/2005 Matsukubo et al. ......... 358/1.15
2008/0068649 A1* 3/2008 Emori .......................... 358/1.15
2009/0153892 A1 6/2009 Torii
2009/0251732 A1* 10/2009 Igarashi ...................... 358/1.15
2009/0303536 A1* 12/2009 Koga .......................... 358/1.15

FOREIGN PATENT DOCUMENTS

| JP | A-2001-287421 | 10/2001 |
| JP | A-2007-276144 | 10/2007 |
| JP | A-2010-3035 | 1/2010 |

* cited by examiner

*Primary Examiner* — Benny Q Tieu
*Assistant Examiner* — Juan M Guillermety
(74) *Attorney, Agent, or Firm* — Oliff & Berridge, PLC (57) ABSTRACT

An image processing apparatus includes a receiving unit, a recognition unit, a calculation unit, a determination unit, and a controller. The receiving unit receives a print job. The recognition unit recognizes hardware information regarding the image processing apparatus. The calculation unit calculates a time required for image processing of the received print job in accordance with the recognized hardware information and image data in the print job. The determination unit determines whether or not the calculated time required for the image processing of the print job is shorter than a predetermined time. The controller performs assignment control so that, when the determination unit determines that the time required for the image processing of the print job is not shorter than the predetermined time, a dynamic reconfigurable processor included in another image processing apparatus processes a portion of the print job.

7 Claims, 11 Drawing Sheets

| WORKSTATION NO. | HARDWARE ACCELERATOR NO. | DRAWING PROCESSOR NO. | FUNCTION |
|---|---|---|---|
| 3A | 13A-1 | 22-1 TO 22-N | RIP-ASSIST FUNCTION FOR FRONT SIDE OF ROLL PAPER |
| 3A | 13A-2 | 22-1 TO 22-N | PAGE CREATION FUNCTION |
| ⋮ | ⋮ | ⋮ | ⋮ |
| 3A | 13A-N | 22-1 TO 22-N | PAGE CREATION FUNCTION |
| 3B | 13B-1 | 22-1 TO 22-N | RIP-ASSIST FUNCTION FOR BACK SIDE OF ROLL PAPER |
| 3B | 13B-2 | 22-1 TO 22-N | PAGE CREATION FUNCTION |
| ⋮ | ⋮ | ⋮ | ⋮ |
| 3B | 13B-N | 22-1 TO 22-N | PAGE CREATION FUNCTION |

FIG. 7B

| WORKSTATION NO. | HARDWARE ACCELERATOR NO. | DRAWING PROCESSOR NO. | FUNCTION |
|---|---|---|---|
| 3A | 13A-1 | 22-1 TO 22-3 | RIP-ASSIST FUNCTION FOR FRONT SIDE OF ROLL PAPER |
| 3A | 13A-1 | 22-4 TO 22-N | PAGE CREATION FUNCTION |
| ⋮ | ⋮ | ⋮ | ⋮ |

FIG. 7C

| WORKSTATION NO. | HARDWARE ACCELERATOR NO. | DRAWING PROCESSOR NO. | FUNCTION |
|---|---|---|---|
| 3A | 13A-1 | 22-1 | RIP-ASSIST FUNCTION FOR FRONT SIDE OF ROLL PAPER (EXPANSION PROCESS) |
| 3A | 13A-1 | 22-2 | RIP-ASSIST FUNCTION FOR FRONT SIDE OF ROLL PAPER (CALIBRATION PROCESS) |
| ⋮ | ⋮ | ⋮ | ⋮ |

IMAGE PROCESSING APPARATUS, IMAGE FORMING APPARATUS, AND COMPUTER READABLE MEDIUM STORING PROGRAM FOR SHARED IMAGE PROCESSING

CROSS-REFERENCE TO RELATED APPLICATIONS

This application is based on and claims priority under 35 USC 119 from Japanese Patent Application No. 2010-066221 filed Mar. 23, 2010.

BACKGROUND

(i) Technical Field

The present invention relates to an image processing apparatus, an image forming apparatus, and a computer readable medium storing a program.

SUMMARY

According to an aspect of the invention, there is provided an image processing apparatus including a receiving unit, a recognition unit, a calculation unit, a determination unit, and a controller. The receiving unit receives a print job. The recognition unit recognizes hardware information regarding the image processing apparatus. The calculation unit calculates a time required for image processing of the print job received by the receiving unit in accordance with the hardware information recognized by the recognition unit and image data in the print job. The determination unit determines whether or not the time required for the image processing of the print job calculated by the calculation unit is shorter than a predetermined time. The controller performs assignment control so that, when the determination unit determines that the time required for the image processing of the print job is not shorter than the predetermined time, a dynamic reconfigurable processor included in a second image processing apparatus different from the image processing apparatus processes a portion of the print job.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described hereinafter with reference to the drawings.

Figure 1:
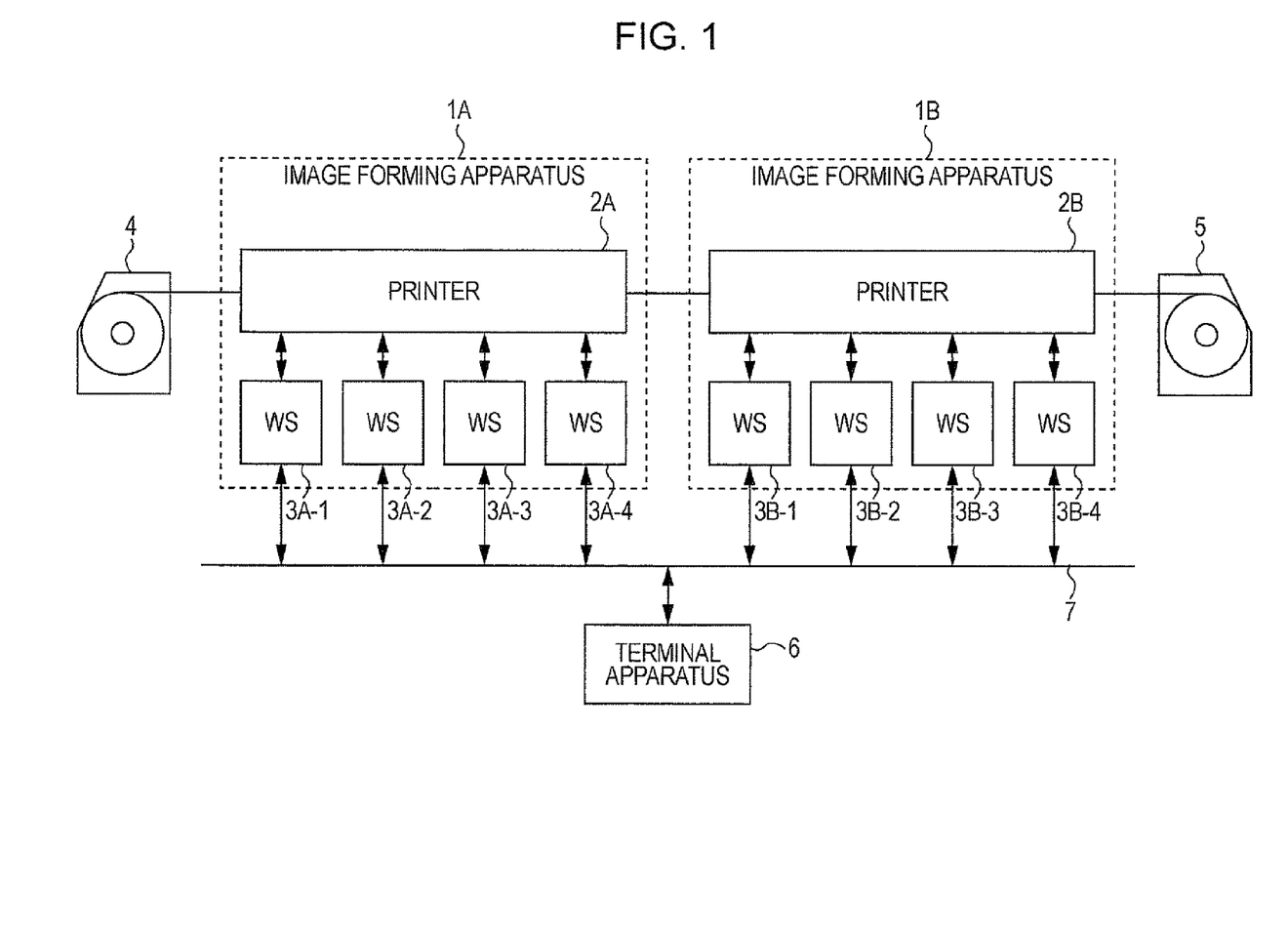
FIG. 1 is a block diagram illustrating the configuration of a system including an image forming apparatus according to an exemplary embodiment.

FIG. 1 is a block diagram illustrating the configuration of a system including an image forming apparatus according to the exemplary embodiment.

The system illustrated in FIG. 1 includes image forming apparatuses 1A and 1B, a pre-processing apparatus 4, a post-processing apparatus 5, and a terminal apparatus 6. The image forming apparatuses 1A and 1B may be professional large format printing systems, and include printers 2A and 2B and workstations 3A-1 to 3A-4 and 3B-1 to 3B-4, respectively. The number of workstations connected to each printer is not limited to four, and may be at least one. In the following description, plural elements having the same function are specified by a single reference numeral unless specifically identified. For example, the workstations 3A-1 to 3A-4 and 3B-1 to 3B-4 are referred to as "workstations 3A" and "workstations 3B", respectively.

The workstations 3A and 3B may be computers, and are connected to the terminal apparatus 6 via a network 7. The terminal apparatus 6 may be connected to the workstations 3A and 3B via a high-speed data transfer medium. The workstations 3A and 3B may also be connected to the printers 2A and 2B, respectively, via a high-speed data transfer medium.

The pre-processing apparatus 4 holds continuous paper wound in a roll (hereinafter referred to as "roll paper"), and transports the roll paper to the printer 2A. The printer 2A prints image data, text data, or other desired data on the front side of the roll paper, and outputs the printed roll paper. The roll paper output from the printer 2A is reversed and is input to the printer 2B. The printer 2B prints image data, text data, or other desired data on the back side of the roll paper, and outputs the roll paper to the post-processing apparatus 5. The post-processing apparatus 5 rewinds the roll paper output from the printer 2B.

The terminal apparatus 6 generates a print job to be printed on the roll paper by the printers 2A and 2B, and a printing instruction, and transmits the print job and the printing instruction to the workstations 3A and 3B via the network 7. The workstations 3A and 3B receive the print job and printing instruction transmitted from the terminal apparatus 6, and convert the print job into raster image data that can be printed by the printers 2A and 2B. Further, the workstations 3A and 3B control the printing operation of the printers 2A and 2B so that the raster image data is printed on the roll paper by the printers 2A and 2B. Raster data represents grids of values of pixels into which an image is divided, indicating the color or density of the pixels, using a color system such as an RGB color system based on red, green, and blue or a YMCK color system based on yellow, magenta, cyan, and black. The printers 2A and 2B print image data, text data, and other desired data on the roll paper in accordance with the printing instruction under the control of the workstations 3A and 3B, respectively.

The printers 2A and 2B may form, for example, image data, text data, or other desired data for two pages of A4 size in the width direction of the roll paper. Further, the printers 2A and 2B may print, for example, image data, text data, or other desired data of A4 size in a continuous manner in the direction in which the roll paper is transported. The printers 2A and 2B may be color printers or monochrome printers.

Figure 2:
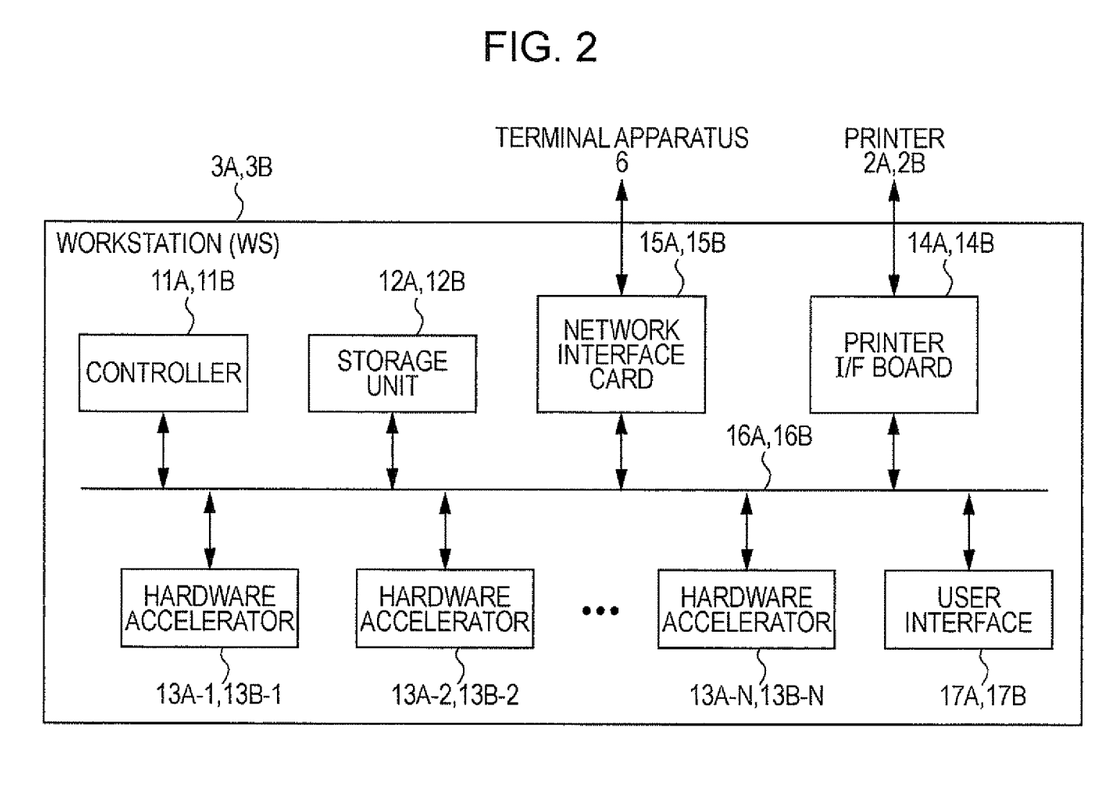
FIG. 2 is a configuration diagram of a workstation.

FIG. 2 is a configuration diagram of the workstations 3A and 3B. In FIG. 2, elements of the workstation 3B are represented by numbers in parentheses.

The workstation 3A includes a controller 11A (determination unit, execution unit), a storage unit 12A, hardware accelerators 13A-1 to 13A-N, where N is a natural number, a printer interface (I/F) board 14A, a network interface card (NIC) 15A, and a user interface (UI) 17A (instruction unit). Similarly, the workstation 3B includes a controller 11B (determination unit, execution unit), a storage unit 12B, hardware accelerators 13B-1 to 13B-N, a printer interface (I/F) board 14B, a network interface card (NIC) 15B, and a UI 17B (instruction unit). The configuration of the workstation 3B is similar to the configuration of the workstation 3A, and a description thereof is thus omitted.

The controller 11A may be formed of a central processing unit (CPU), and is connected to the storage unit 12A, the hardware accelerators 13A-1 to 13A-N, the printer I/F board 14A, the network interface card (NIC) 15A, and the UI 17A via a bus 16A. The controller 11A controls the operation of the storage unit 12A, the hardware accelerators 13A-1 to 13A-N, the printer I/F board 14A, the network interface card (NIC) 15A, and the UI 17A. Further, the controller 11A communicates with the controller 11B of the workstation 3B via the network interface card (NIC) 15A.

The network interface card 15A receives a print job transmitted from the terminal apparatus 6. The hardware accelerators 13A-1 to 13A-N perform various image processing operations, which have been specified, on the print job to convert the print job into raster image data that can be printed by the printer 2A, and store the raster image data in the storage unit 12A. The hardware accelerators 13A-1 to 13A-N are capable of communicating with the hardware accelerators 138-1 to 13B-N of the workstation 3B via the network interface card (NIC) 15A. The storage unit 12A may be implemented by a memory, a hard disk drive, or any other suitable device. The printer I/F board 14A performs predetermined processing on the print data subjected to the image processing operations, which is stored in the storage unit 12A, and transfers the resulting print data to the printer 2A. The predetermined processing may include a calibration process for performing tone correction of image data using correction data from the printer 2A (for example, color reproduction characteristic distribution data on a drum), and a protocol selection process for selecting a protocol to be used to transfer the print data.

The UI 17A may be used for editing data, table information, or any other suitable data stored in the storage unit 12A or for controlling the operation of the printer 2A.

Figure 3:
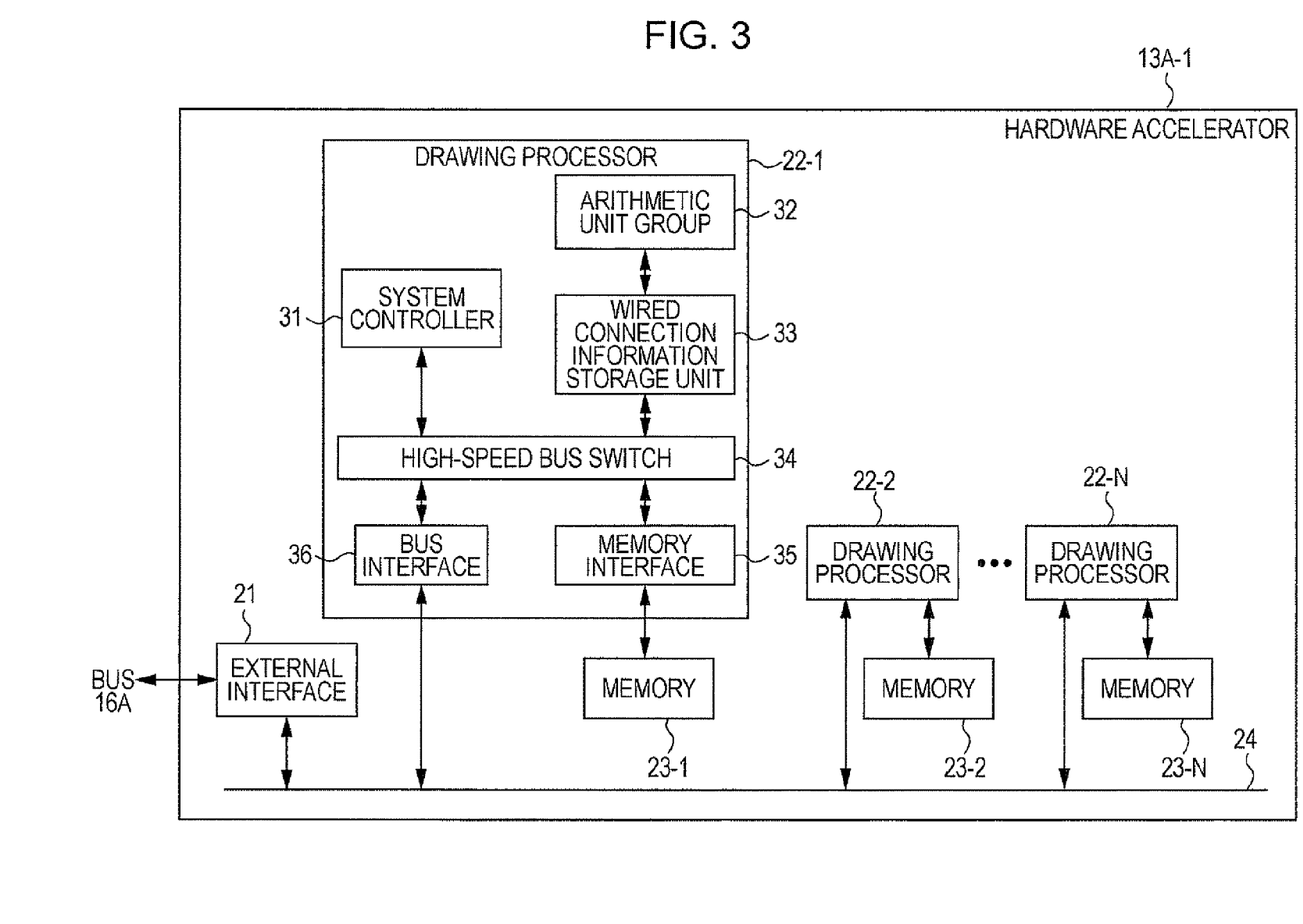
FIG. 3 illustrates the configuration of a hardware accelerator.

FIG. 3 is a diagram illustrating the configuration of the hardware accelerator 13A-1. The configuration of the hardware accelerators 13A-2 to 13A-N and 13B-1 to 13B-N is similar to the configuration of the hardware accelerator 13A-1.

The hardware accelerator 13A-1 may serve as a RIP-assist board for assisting a software-based raster image processor (RIP). The hardware accelerator 13A-1 may also serve as a page creation board for creating a page of a specified size (for example, A4 size) on roll paper.

The hardware accelerator 13A-1 includes an external interface 21, drawing processors 22-1 to 22-N, where N is a natural number, and memories 23-1 to 23-N. The drawing processors 22-1 to 22-N are connected to the external interface 21 via a bus 24. The drawing processors 22-1 to 22-N are connected to the memories 23-1 to 23-N, respectively.

The external interface 21 may be a communication interface provided between the bus 16A illustrated in FIG. 2 and the bus 24. The external interface 21 executes data communication between the controller 11A illustrated in FIG. 2 and the drawing processors 22-1 to 22-N.

Next, the configuration of the drawing processor 22-1 will be described. The configuration of the drawing processors 22-2 to 22-N is similar to the configuration of the drawing processor 22-1.

The drawing processor 22-1 may be a processor (dynamic reconfigurable processor) capable of dynamically replacing its on-chip circuit configuration. In response to an instruction for performing multiple image processing operations, the drawing processor 22-1 repeatedly executes a process of replacing the circuit configuration. For example, after the end of the initial image processing operation, the drawing processor 22-1 may replace the on-chip circuit configuration to support the next image processing operation. The drawing processor 22-1 includes a system controller 31, an arithmetic unit group 32, a wired connection information storage unit 33, a high-speed bus switch 34, a memory interface 35, and a bus interface 36.

The arithmetic unit group 32 may include various arithmetic units such as an adder and a multiplier. The wired connection information storage unit 33 stores plural pieces of wired connection information for implementing image processing requested from the controller 11A by combining various arithmetic units included in the arithmetic unit group 32. The plural pieces of wired connection information are read from the memory 23-1, and are stored in the wired connection information storage unit 33.

The system controller 31 executes a requested image processing by selecting one of the pieces of wired connection information stored in the wired connection information storage unit 33 in accordance with an image processing command (image processing request) from the controller 11A and by combining various arithmetic units included in the arithmetic unit group 32 in accordance with the selected piece of wired connection information. Therefore, even upon receipt of an instruction for performing plural image processing operations, the drawing processor 22-1, which may be a dynamic reconfigurable processor, executes the requested plural image processing operations only by appropriately changing wired connection information. Thus, the chip area is smaller than that in a field programmable gate array (FPGA) or application specific integrated circuit (ASIC) processor. In the exemplary embodiment, dynamic reconfigurable processors are used as the drawing processors 22. However, FPGA or ASIC processors may be used as the drawing processors 22.

The high-speed bus switch 34 may be a bus switch that allows quick switching of a data path among the system controller 31, the arithmetic unit group 32, the memory interface 35, and the bus interface 36. The memory interface 35 may be an interface for transmitting and receiving data between the memory 23-1 and the high-speed bus switch 34. The bus interface 36 may be an interface for transmitting and receiving data between the bus 24 and the high-speed bus switch 34. The memory 23-1 stores connection information described below, a table, and other suitable data.

With the use of the above configuration, the drawing processor 22-1 implements an image processing function specified in an image processing command from the controller 11A.

Figure 4:
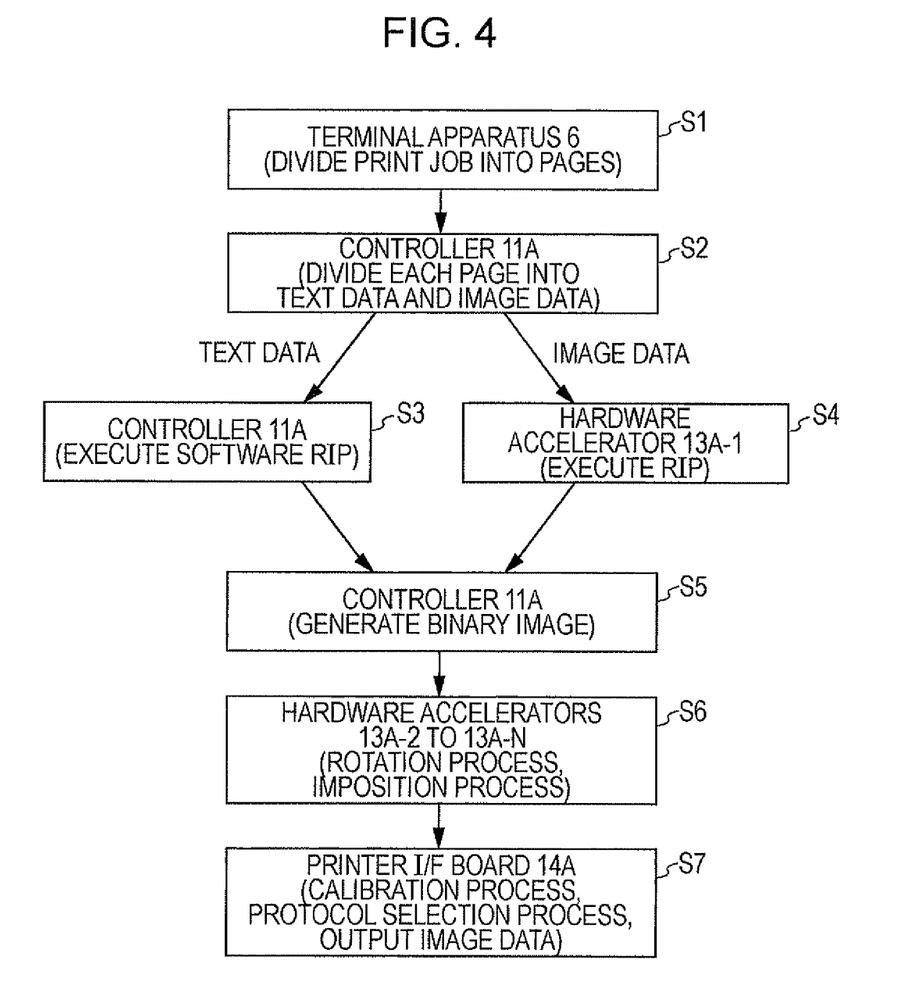
FIG. 4 is a flowchart illustrating a process executed by a terminal apparatus and a workstation.

FIG. 4 is a flowchart illustrating a process executed by the terminal apparatus 6 and the workstation 3A. The process illustrated in FIG. 4 may also be executed by the workstation 3B.

First, the terminal apparatus 6 receives a print job, and divides the print job into pages (step S1). Then, the controller 11A divides data included in each page into text data and image data (step S2). The controller 11A executes a RIP process by software on the obtained text data (step S3).

The hardware accelerator 13A-1 executes a RIP process on the obtained image data (step S4). Plural hardware accelerators may execute the processing of step S4. The RIP process performed in step S4 may include various image processing such as a Joint Photographic Experts Group (JPEG) expansion process, an enlargement/reduction process, and a color space conversion process. Then, in step S4, a RIP-processed raw image in YMCK format is generated.

Then, the controller 11A receives the RIP-processed image data, and combines the RIP-processed image data with the text data on which a RIP process has been performed by software to generate binary images of respective YMCK colors (step S5).

The hardware accelerators 13A-2 to 13-N receive image data for one page, which forms a binary image, and executes a rotation process or an imposition process (a process for defining a layout of, for example, two pages of image data of A4 size in an A3-size region) on the received image data (step S6).

Finally, the printer I/F board 14A receives image data on which a rotation process or an imposition process has been performed from the hardware accelerators 13A-2 to 13-N, and executes a calibration process for performing tone correction of the received image data using correction data from the printer 2A (for example, color reproduction characteristic distribution data on a drum) and a protocol selection process for selecting a protocol to be used to transfer the print data. Then, the printer I/F board 14A transmits image data on which all the processes have been performed to the printer 2A (step S7).

Figure 5:
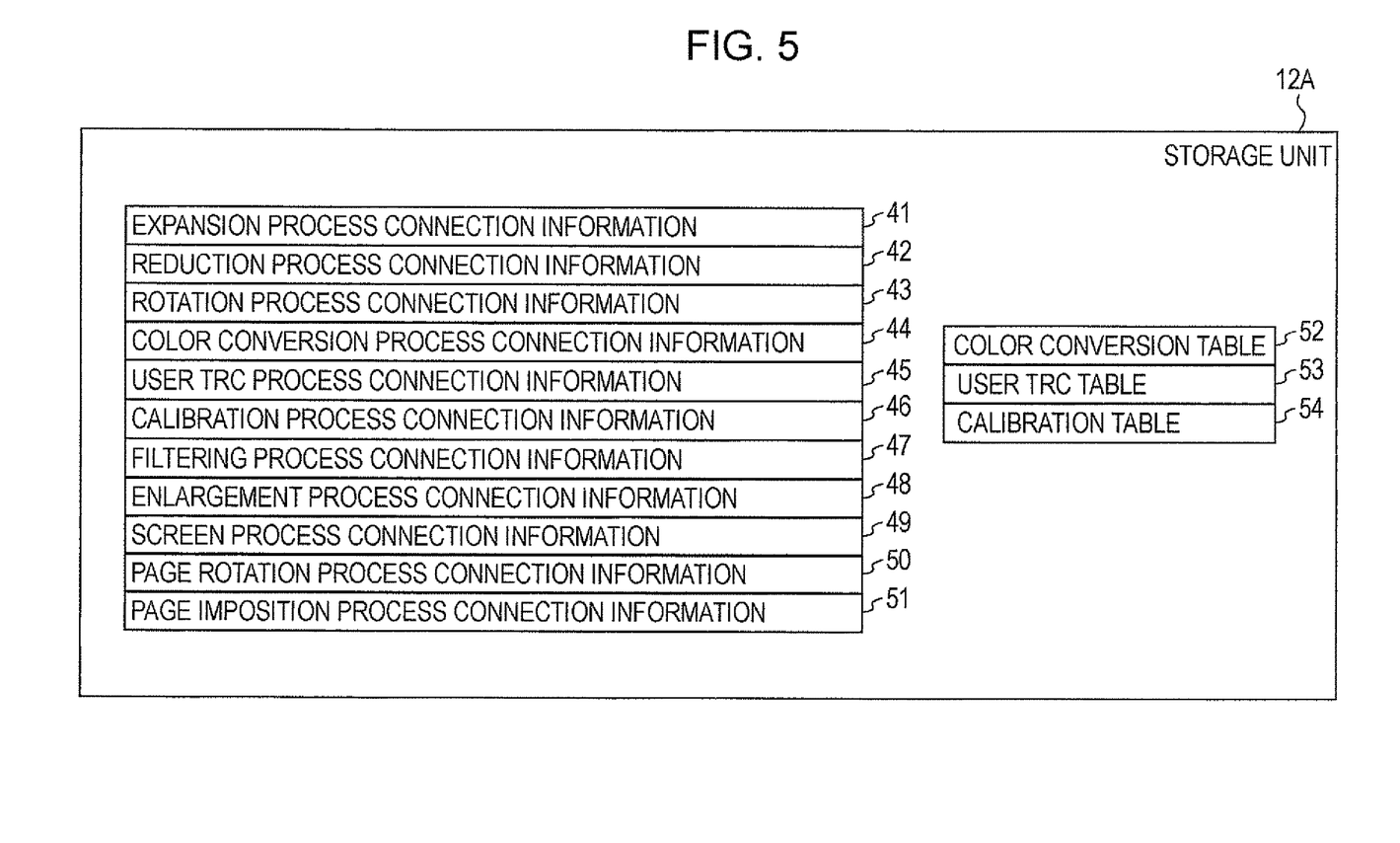
FIG. 5 illustrates an example of data stored in a storage unit.

FIG. 5 is a diagram illustrating an example of data stored in the storage unit 12A. The storage unit 12B stores similar data.

As illustrated in FIG. 5, the storage unit 12A includes expansion process connection information 41, reduction process connection information 42, rotation process connection information 43, color conversion process connection information 44, user tone reproduction curve (TRC) process connection information 45, calibration process connection information 46, filtering process connection information 47, enlargement process connection information 48, screen process connection information 49, page rotation process connection information 50, and page imposition process connection information 51. Further, the storage unit 12A includes a color conversion table 52, a user TRC table 53, and a calibration table 54. Each connection information includes the wired connection information described above, parameters for determining the operation of the drawing processors 22, and other suitable data.

The connection information and tables described above are used by the drawing processors 22. The expansion process connection information 41 may be used in a process for expanding image data such as a JPEG expansion process. The reduction process connection information 42 may be used when the drawing processors 22 reduce image data. The rotation process connection information 43 may be used when the drawing processors 22 rotate image data.

The color conversion process connection information 44 and the color conversion table 52 may be used when the drawing processors 22 execute color conversion of image data. For example, the drawing processors 22 convert the RGB components of image data into the CMY components in accordance with the color conversion table 52. The user TRC process connection information 45 and the user TRC table 53 may be used when the drawing processors 22 perform tone correction of image data. For example, the drawing processors 22 perform tone correction of image data in accordance with a tone correction curve in the user TRC table 53, which is specified by the user.

The calibration process connection information 46 and the calibration table 54 may be used when the drawing processors 22 execute a calibration process on image data. The calibration process is a process for performing tone correction of image data to compensate for the effect of environmental change or aging change on the printer 2A. The calibration table 54 is updated when the drawing processors 22 receive correction data from the printer 2A at a predetermined timing (such as at the time of the start of a print job or at the end of each printing operation of 1,000 pages). The filtering process connection information 47 may be used when the drawing processors 22 remove noise in image data.

The enlargement process connection information 48 may be used when the drawing processors 22 enlarge image data to a specified size. The screen process connection information 49 may be used when the drawing processors 22 convert multivalued image data of the CMY components and multivalued image data of the K component into binary image data of the CMYK components. The page rotation process connection information 50 may be used when the drawing processors 22 rotate image data for one page. The page imposition process connection information 51 may be used when the drawing processors 22 define a layout of each page of image data in a predetermined region.

When the controller 11A outputs an image processing request to the drawing processor 22-1, connection information including wired connection information and a table, which are specified by the image processing request, are output together to the drawing processor 22-1, and are stored in the memory 23-1. The connection information stored in the memory 23-1 is stored in the wired connection information storage unit 33 by using the system controller 31. The system controller 31 selects a piece of wired connection information stored in the wired connection information storage unit 33 in accordance with the image processing request, and combines various arithmetic units included in the arithmetic unit group 32 in accordance with the selected piece of wired connection information to create a circuit that executes the corresponding image processing operation. Then, the requested image processing is executed. In image processing that requires a table, the system controller 31 reads a table from the memory 23-1, as desired.

Figure 6A:
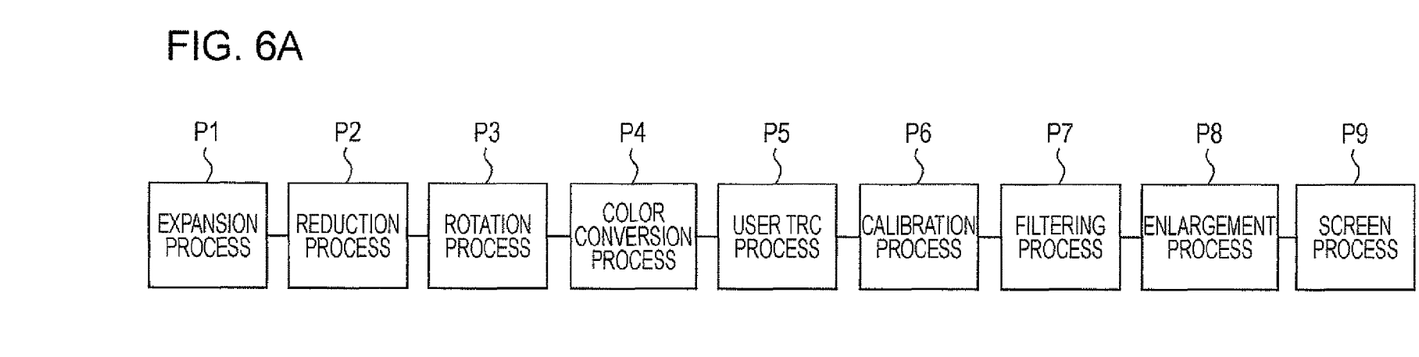
FIG. 6A is a sequence diagram illustrating an example of image processing executed by a hardware accelerator.
Figure 6B:
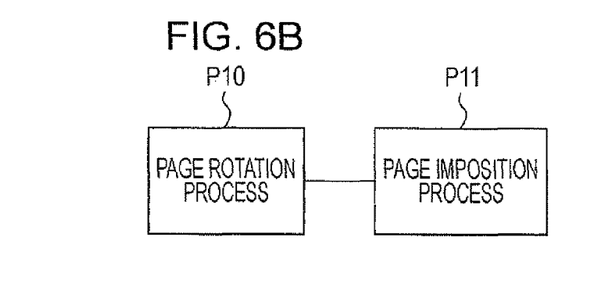
FIG. 6B is a sequence diagram illustrating an example of image processing executed by other hardware accelerators.

FIG. 6A is a sequence diagram illustrating an example of image processing executed by the hardware accelerator 13A-1. FIG. 6B is a sequence diagram illustrating an example of image processing executed by the hardware accelerators 13A-2 to 13A-N. FIG. 6C is a sequence diagram illustrating an example of processes executed by the printer I/F board 14A.

In FIG. 6A, the hardware accelerator 13A-1 functions as a RIP-assist board (hereinafter referred to as a "RIP-assist function") for assisting a software-based RIP, and executes a RIP process on image data. RIP processes executed using the RIP-assist function include an expansion process (P1) using the expansion process connection information 41, a reduction process (P2) using the reduction process connection information 42, a rotation process (P3) using the rotation process connection information 43, a color conversion process (P4) using the color conversion process connection information 44 and the color conversion table 52, a user TRC process (P5) using the user TRC process connection information 45 and the user TRC table 53, a calibration process (P6) using the calibration process connection information 46 and the calibration table 54, a filtering process (P7) using the filtering process connection information 47, an enlargement process (P8) using the enlargement process connection information 48, and a screen process (P9) using the screen process connection information 49. The calibration table 54 may be a lookup table in which color data of each color of an input image is associated with color data of the corresponding color of an output image. As described above, the drawing processors 22 included in the hardware accelerator 13A-1 execute requested plural image processing operations merely by appropriately changing wired connection information. Thus, after the end of each of the processes P1 to P8, the drawing processors 22 sequentially replace the on-chip circuit configuration to support the next process.

In FIG. 6B, each of the hardware accelerators 13A-2 to 13A-N functions as a page creation board (hereinafter referred to as a "page creation function") for creating a page of a specified size (for example, A4 size) on roll paper. Processes executed using the page creation function include a page rotation process (P10) using the page rotation process connection information 50, and a page imposition process (P11) using the page imposition process connection information 51.

Plural hardware accelerators may serve as RIP-assist boards, or a single hardware accelerator may serve as a page creation board.

A user sets image processing operations executed as the RIP-assist function or the page creation function among the above image processing operations (P1 to P11) and the processing order in the controller 11A through the UI 17A or the terminal apparatus 6. The image processing operations executed as the RIP-assist function or the page creation function and the processing order are saved in the storage unit 12A as setting information. The setting information is represented in the sequence diagrams illustrated in FIGS. 6A and 6B. Upon receipt of a print job from the terminal apparatus 6, the controller 11A reads setting information from the storage unit 12A, and sequentially outputs the connection information and table corresponding to the set processes to a hardware accelerator 13A that is specified by a database illustrated in FIGS. 7A to 7C described below in accordance with the setting information. Setting information, which may be set using a sequence diagram, allows a user to easily recognize image processing operations executed by the hardware accelerator 13A and the printer I/F board 14A and the processing order.

Figure 7A:
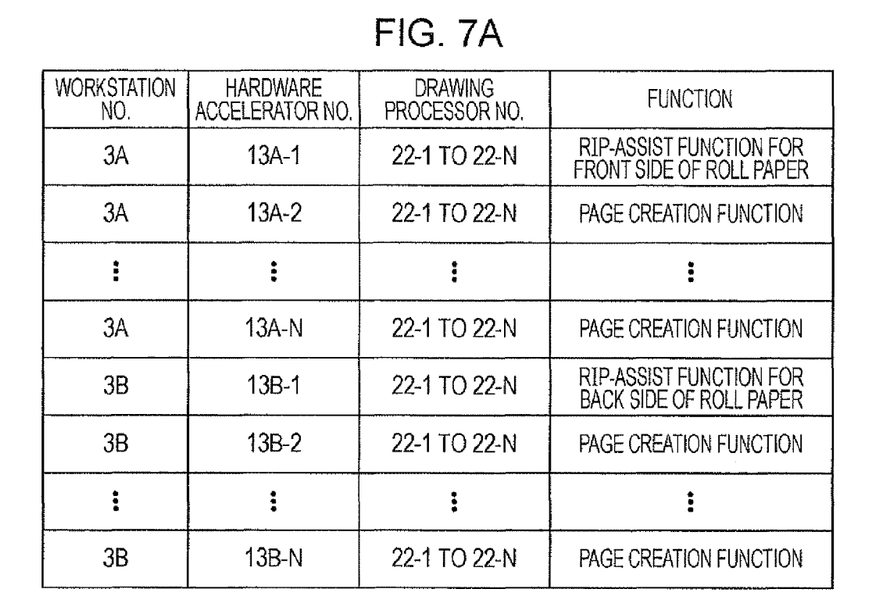
FIG. 7A is a database illustrating the relationship between the workstation, hardware accelerator, and drawing processor numbers, and functions.
Figure 7B:
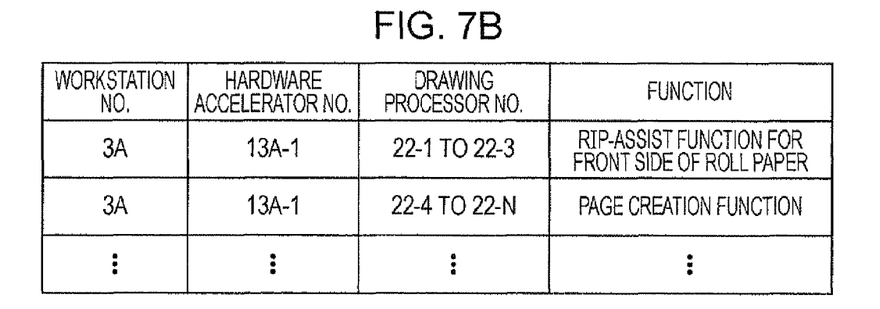
FIGS. 7B and 7C illustrate portions of the database illustrated in FIG. 7A.
Figure 7C:
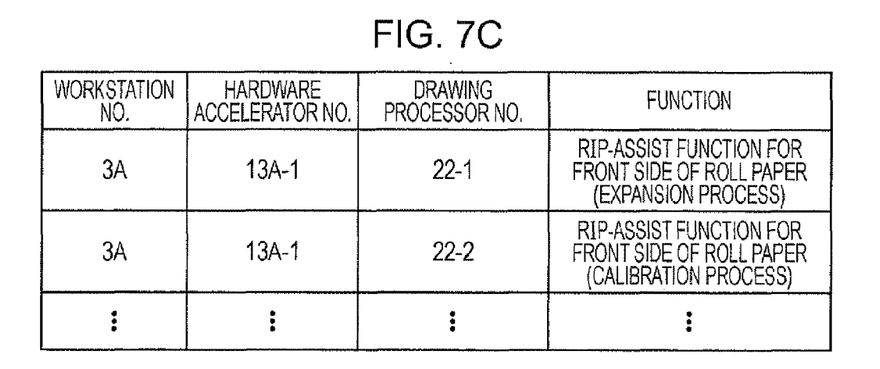

FIG. 7A illustrates a database representing the relationship between the workstation, hardware accelerator, and drawing processor numbers, and functions. FIGS. 7B and 7C illustrate portions of the database illustrated in FIG. 7A.

The database illustrated in FIG. 7A is stored in the storage unit 12A, and is set using the UI 17A provided in the workstation 3A or using the terminal apparatus 6. Further, the database illustrated in FIG. 7A may be edited using the UI 17A or the terminal apparatus 6. The database is also stored in the storage unit 12B.

As illustrated in FIG. 7A, the database describes the relationship between the numbers of the hardware accelerators and drawing processors included in all the workstations, and functions. In FIG. 7A, all the drawing processors 22-1 to 22-N included in the hardware accelerator 13A-1 are assigned the RIP-assist function for the front side of the roll paper. Alternatively, for example, as illustrated in FIG. 7B, the RIP-assist function or the page creation function may be assigned to each drawing processor included in the hardware accelerator 13A-1. Further, as illustrated in FIG. 7C, a specific image processing operation in the RIP-assist function or the page creation function may be assigned to a drawing processor.

In accordance with the above database, the controller 11A recognizes the hardware accelerators and the drawing processors that are assigned the RIP-assist function and the page creation function. The hardware accelerators 13A or drawing processors 22 to be assigned to the respective image processing operations are changed in accordance with the database. However, the controller 11A may change the hardware accelerators 13A or drawing processors 22 to be assigned to the respective image processing operations in response to an instruction (specifically, for updating the database) from the terminal apparatus 6 or the UI 17A.

Figure 8:
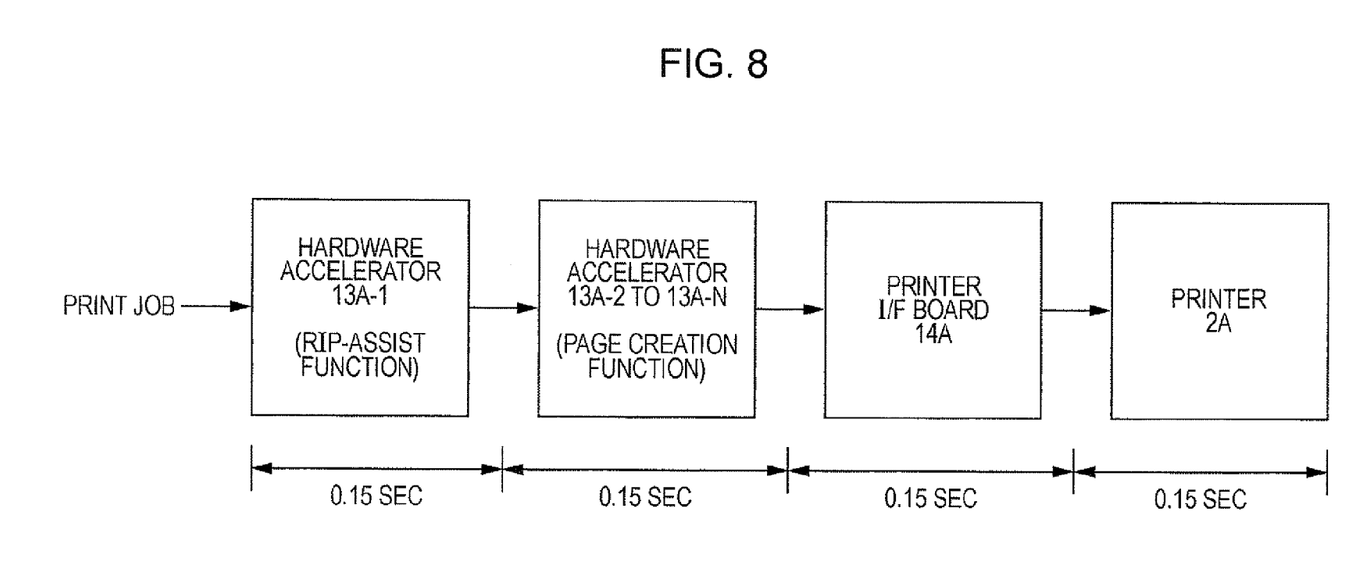
FIG. 8 illustrates the relationship between the processing time of a printer and the processing time of a workstation.

FIG. 8 illustrates the relationship between the processing time of the printer 2A and the processing time of the workstation 3A.

As illustrated in FIG. 8, in a case where the printer 2A prints image data for one page of A4 size with a resolution of 600 dots per inch (dpi) by 600 dpi at a speed of 400 pages per minutes (ppm), printing is completed in 0.15 seconds (=60/400 ppm). Therefore, in order to make the best use of the processing performance of the printer 2A, it is desirable that, for example, the hardware accelerator 13A-1 execute the RIP-assist function within 0.15 seconds and output the image data to the hardware accelerators 13A-2 to 13A-N. Further, it is desirable that the hardware accelerators 13A-2 to 13A-N execute the page creation function within 0.15 seconds and output the image data to the printer I/F board 14A. Further, it is desirable that the printer I/F board 14A execute predetermined processing within 0.15 seconds and output the image data to the printer 2A.

As illustrated in FIGS. 6A and 6B, the RIP-assist function and the page creation function are sequences including plural image processing operations. The controller 11A calculates the time required for each image processing operation using the number of pixels of input image data. The time required for the drawing processors 22 to process a predetermined number of pixels is determined in advance. For example, the time required for a drawing processor to process 100,000 pixels may be $\frac{1}{10000}$ seconds.

In the RIP-assist function, in a case where the processing time of each drawing processor 22 is 3 seconds and the RIP-assist function is completed within 0.15 seconds, 20 (=3/0.15) drawing processors 22 are necessary. In this case, if four drawing processors 22 are mounted per hardware accelerator 13A, five hardware accelerators 13A are necessary. Even if each of the workstations 3A-1 to 3A-4 has one hardware accelerator 13A, one hardware accelerator 13A or four drawing processors 22 are additionally needed.

In the exemplary embodiment, in a case where all the image processing operations are not completed within a desired image processing time even with the use of the hardware accelerators 13A or drawing processors 22 mounted in the workstation 3A, the hardware accelerators 13B or drawing processors 22 mounted in the workstation 3B are used. That is, upon receipt of a print job that requires a long processing time, the workstation 3A uses the drawing processors 22 included in the workstation 3B which has received a print job that requires a short processing time, by taking into account the time difference between the processing time of the print job applied to the front side and the processing time of the print job applied to the back side.

Figures 9, 9A:
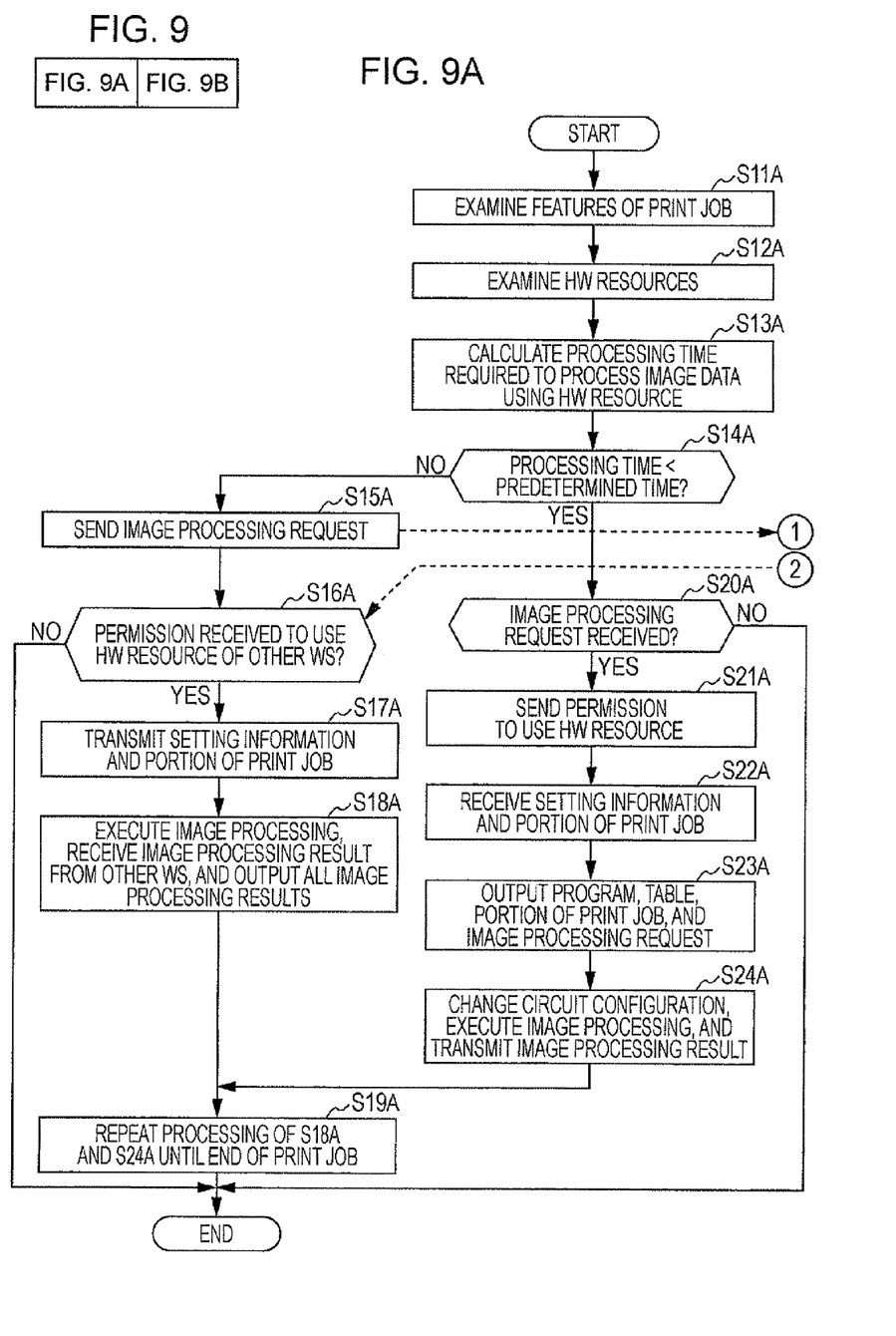
FIG. 9 is a flowchart illustrating processes executed by workstations.
Figure 9B:
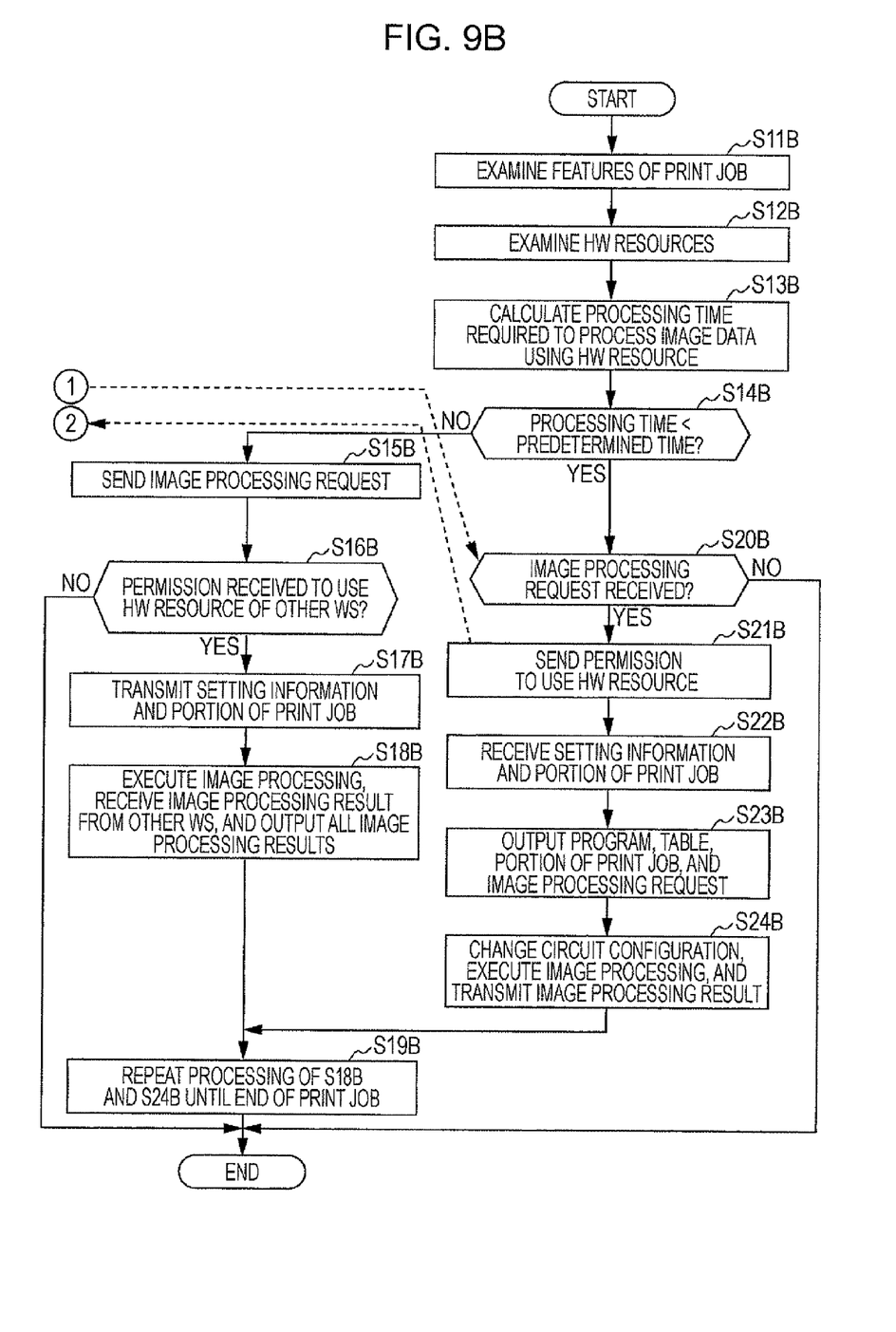

FIG. 9 is a flowchart illustrating processes executed by the workstations 3A and 3B. Here, the workstation 3A executes the process in the left part of the flowchart illustrated in FIG.

9, and the workstation 3B executes the process in the right part of the flowchart illustrated in FIG. 9. Further, it may be assumed that the printer 2A prints pages of image data on the front side of roll paper and that the printer 2B prints pages of text data on the back side of the roll paper.

First, the controller 11A examines features of a print job (step S11A). Specifically, the controller 11A determines whether or not the data included in the print job is image data. Here, only the data included in the print job is image data.

Then, the controller 11A examines hardware resources (drawing processors 22) provided in the workstation 3A (step S12A). Specifically, the controller 11A examines the number of drawing processors 22 provided in the workstation 3A or the version of the drawing processors 22.

Then, the controller 11A calculates the processing time required to process image data for one page of A4 size in the print job using the hardware resources (step S13A). The controller 11A may calculate the processing time by, for example, multiplying the time required for one drawing processor 22 to process a predetermined number of pixels by the number of drawing processors 22 provided in the workstation 3A and by dividing the number of pixels of one piece of image data of A4 size by the multiplication result.

Then, the controller 11A determines whether or not the processing time is shorter than a predetermined time (step S14A). The predetermined time may be a value given by multiplying the number of hardware resources provided in the workstation 3A by the time required for one drawing processor 22 to perform an image processing operation of one piece of image data of A4 size. In other words, the predetermined time may be a value determined by multiplying the number of hardware resources provided in the workstation 3A by a predefined processing time (that is, the processing time required for one hardware resource to process one page of image data).

If NO is determined in step S14A, that is, if the workstation 3A alone is not sufficient to process the print job within a predetermined time, the controller 11A sends an image processing request to the controller 11B (step S15A). The controller 11A determines whether or not a permission to use the hardware resources of the workstation 3B has been received from the controller 11B (step S16A). If NO is determined in step S16A, the controller 11A determines that execution of the image processing is not possible, and then the process ends. If YES is determined in step S16A, the controller 11A transmits setting information including image processing operations to be executed and the processing order and a portion of the print job to the controller 11B (step S17A).

Then, the hardware accelerator 13A and the printer I/F board 14A execute image processing. In addition, the printer I/F board 14A receives an image processing result from the controller 11B and outputs all the image processing results to the printer 2A (step S18A). The processing of step S18A and the processing of step S24A described below are repeated until the end of the print job (step S19A). When the print job ends, the process ends.

If YES is determined in step S14A, that is, if the workstation 3A alone is sufficient to process the print job within the predetermined time, the controller 11A determines whether or not an image processing request has been received from the controller 11B (step S20A). If NO is determined in step S20A, the workstation 3A is in a normal operating state, and the process ends. If YES is determined in step S20A, the controller 11A sends a permission to use the hardware resources of the workstation 3A to the controller 11B (step S21A). The controller 11A receives from the controller 11B setting information including image processing operations to be executed and the processing order and a portion of a print job (step S22A). The controller 11A sequentially outputs a program and table corresponding to the image processing operation specified by the received setting information, the portion of the print job, and the image processing request to hardware accelerators 13A that are available to use (step S23A). The drawing processors 22 in the hardware accelerators 13A change the circuit configuration in accordance with the image processing request, execute image processing of the portion of the print job in accordance with the received program and table, and transmit an image processing result to the controller 11B (step S24A). Then, the process proceeds to step S19A.

If the workstation 3A alone is not sufficient to process the print job within the predetermined time (NO in step S41), as illustrated in steps S15A to S17A, the controller 11A utilizes the drawing processors 22 provided in the workstation 3B to process the print job within the predetermined time. If the workstation 3A alone is sufficient to process the print job within the predetermined time (YES in step S14A), as illustrated in steps S20A to S24A, the controller 11A assigns the drawing processors 22 provided in the workstation 3A to the workstation 3B to process the print job of the workstation 38. Similarly, the assignment of the drawing processors 22 is also executed by the controller 11B.

Further, here, by way of example, the printer 2A prints pages of image data, and the printer 2B prints pages of text data. Thus, the workstation 3A alone may not necessarily be sufficient to process a print job. Since the printer 2B prints pages of text data, the controller 118 executes a software RIP process. In the workstation 3B, therefore, a drawing processor 22 that is not being used may be present.

Accordingly, when the controller 11A transmits setting information including image processing operations to be executed and the processing order and a portion of the print job to the controller 11B (step S17A), the controller 11B receives the setting information and the portion of the print job (step S22B), and executes image processing of the portion of the print job in accordance with the setting information (steps S23B, S24B).

Figure 10:
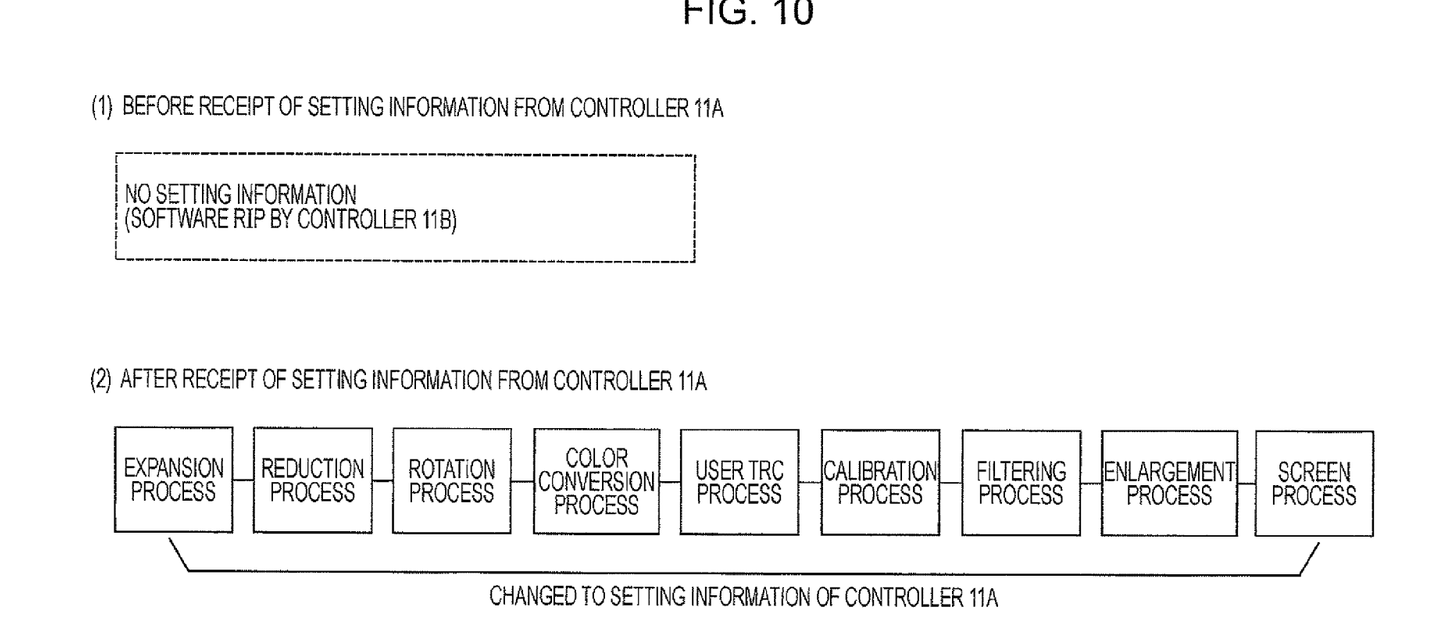
FIG. 10 illustrates an example of changing of setting information regarding a hardware accelerator.

FIG. 10 illustrates an example of changing of setting information regarding the hardware accelerator 13B-1. As illustrated in FIG. 10, before receipt of setting information from the controller 11A, the controller 11B has not yet set setting information in the hardware accelerator 13B-1. The reason may be that the controller 11B executes a software RIP process of text data. After receipt of setting information from the controller 11A, the controller 11B sets the setting information received from the controller 11A in the hardware accelerator 13B-1. This allows the drawing processors 22 included in the hardware accelerator 13B-1 to execute image processing operations of the portion of the print job received from the controller 11A in accordance with the setting information.

The controller 11B may set setting information in the hardware accelerator 13B-1 before receipt of setting information from the controller 11A. In this case, the setting information may be changed.

Referring back to FIG. 9, the processing executed by the workstation 3B (the processing of steps S11B to S24B) is similar to the processing of steps S11A to S24A described above, and detailed descriptions thereof are thus omitted. As illustrated in FIG. 9, when the controller 11A sends an image processing request to the controller 11B (step S15A), in step S20B, the controller 11B determines whether or not an image processing request has been received from the controller 11A. Further, when the controller 11B sends a permission to use the hardware resources of the workstation 3B to the controller 11A (step S21B), the controller 11A determines whether or not a permission to use the hardware resources of the workstation 3B has been received from the controller 11B (step S16A). In this manner, when the process performed by the workstation 3A passes through the route of steps S11A to S19A, the process performed by the workstation 3B may pass through the route of steps S11B to S14B, S20B to S24B, and S19B. Conversely, when the process performed by the workstation 3A passes through the route of steps S11A to S14A, S20A to S24A, and S19A, the process performed by the workstation 3B may pass through the route of steps S11B to S19B.

In FIG. 9, the hardware resources of the drawing processors 22 are assigned between the workstation 3A that executes image processing of image data and the workstation 3B that executes a process of text data. However, the hardware resources of the drawing processors 22 may be assigned between the workstation 3A-1 and the workstations 3A-2 to 3A-4. For example, if image data represents a solid black image and the workstation 3A-1 processes black image data, the drawing processors mounted in the workstations 3A-2 to 3A-4 are not being used. Thus, the workstation 3A-1 may assign the process of the black image data also to the drawing processors 22 mounted in the workstations 3A-2 to 3A-4.

As described above, according to the exemplary embodiment, the controller 11A of the workstation 3A determines whether or not a print job can be processed within a predetermined time using the drawing processors 22 mounted in the workstation 3A. If it is determined that the print job cannot be processed within the predetermined time, the controller 11A shares the drawing processors 22 mounted in the workstation 3B, and causes the drawing processors 22 mounted in the workstation 3A and the shared drawing processors 22 to process the print job. Therefore, the print job is processed more efficiently.

If it is determined that the print job can be processed within the predetermined time, the controller 11A assigns the hardware resources of the drawing processors 22 mounted in the workstation 3A to the workstation 3B to cause the drawing processors 22 mounted in the workstation 3A to process a portion of the print job of the workstation 3B. Therefore, the drawing processors 22 mounted in the workstation 3A are effectively utilized.

In the foregoing exemplary embodiment, furthermore, the controller 11A automatically assigns drawing processors 22 between the workstations 3A and 3B. However, the controller 11A may assign drawing processors 22 between the workstations 3A and 3B in response to an instruction (specifically, for updating the database) from the terminal apparatus 6 or the UI 17A.

In another exemplary embodiment, a recording medium on which a program of software for implementing the functions of the workstation 3A is recorded may be supplied to the workstation 3A, and the controller 11A may read and execute the program stored in the recording medium. Examples of the recording medium through which the program is supplied include a compact disc read only memory (CD-ROM), a digital versatile disc (DVD), and a Secure Digital (SD) card.

In another exemplary embodiment, furthermore, the workstation 3A may execute the program of software for implementing the functions of the workstation 3A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a receiving unit that receives a print job;
    a recognition unit that recognizes hardware information regarding the image processing apparatus;
    a calculation unit that calculates a time required for image processing of the print job received by the receiving unit in accordance with the hardware information recognized by the recognition unit and image data in the print job;
    a determination unit that determines whether or not the time required for the image processing of the print job calculated by the calculation unit is shorter than a predetermined time; and
    a controller that performs assignment control so that, when the determination unit determines that the time required for the image processing of the print job is not shorter than the predetermined time, a dynamic reconfigurable processor included in a second image processing apparatus different from the image processing apparatus processes a portion of the print job, wherein
    when the determination unit determines that the time required for the image processing of the print job is not shorter than the predetermined time, the controller transmits a portion of the print job and setting information to the second image processing apparatus, the setting information being configured to include image processing to be executed and a processing order,
    the second image processing apparatus changes image processing on the basis of a program and table specified by the setting information to be executed by the dynamic reconfigurable processor included in the second image processing apparatus and a processing order in accordance with the setting information, and processes the portion of the print job, and
    the receiving unit receives a processing result of the portion of the print job, wherein
        the image processing is specified by the received setting information.

2. The image processing apparatus according to claim 1, wherein when the determination unit determines that the time required for the image processing of the print job is not shorter than the predetermined time, the controller sends a request for processing a portion of the print job to the second image processing apparatus, and, upon receipt of a permission to use the dynamic reconfigurable processor included in the second image processing apparatus from the second image processing apparatus, assigns the dynamic reconfigurable processor included in the second image processing apparatus to processing of the portion of the print job.

3. The image processing apparatus according to claim 1, wherein
    the calculation unit calculates a processing time required to process image data for one page in the print job using a hardware resource included in the image processing apparatus, and
    the determination unit determines that the print job cannot be processed within the predetermined time when the processing time calculated by the calculation unit is less than a value obtained by multiplying a predetermined processing time required for a single hardware resource to process image data for one page by the number of hardware resources included in the image processing apparatus.

4. An image forming apparatus comprising:
the image processing apparatus according to claim 1; and
a printer that prints a print job processed by the image processing apparatus.

5. The image processing apparatus according to claim 1, wherein the dynamic reconfigurable processor executes a process of replacing its circuit configuration, the dynamic reconfigurable processor included in the second image processing apparatus.

6. A non-transitory computer readable storage medium storing a program causing a computer to execute a process, the process comprising:
receiving a print job;
recognizing hardware information regarding a first image processing apparatus;
calculating a time required for image processing of the received print job in accordance with the recognized hardware information and image data in the print job;
determining whether or not the calculated time required for the image processing of the print job is shorter than a predetermined time; and
performing assignment control so that, when it is determined that the calculated time required for the image processing of the print job is not shorter than the predetermined time, a dynamic reconfigurable processor included in a second image processing apparatus different from the first image processing apparatus executes a portion of the image processing of the print job, wherein
when the determination unit determines that the time required for the image processing of the print job is not shorter than the predetermined time, transmitting a portion of the print job and setting information to the second image processing apparatus, the setting information being configured to include image processing to be executed and a processing order,
the second image processing apparatus changing image processing on the basis of a program and table specified by the setting information to be executed by the dynamic reconfigurable processor included in the second image processing apparatus and a processing order in accordance with the setting information, and processing the portion of the print job, and
receiving a processing result of the portion of the print job, wherein
the image processing is specified by the received setting information.

7. The non-transitory computer readable storage medium according to claim 6, wherein the dynamic reconfigurable processor executes a process of replacing its circuit configuration, the dynamic reconfigurable processor included in the second image processing apparatus.

* * * * *